United States Patent [19]

Beall et al.

[11] Patent Number: 4,519,828
[45] Date of Patent: May 28, 1985

[54] TRANSPARENT GLASS-CERAMICS CONTAINING MULLITE

[75] Inventors: George H. Beall, Big Flats; John F. MacDowell; Mark P. Taylor, both of Painted Post, all of N.Y.

[73] Assignee: Corning Glass Works, Corning, N.Y.

[21] Appl. No.: 479,681

[22] Filed: Mar. 28, 1983

Related U.S. Application Data

[62] Division of Ser. No. 395,617, Jul. 6, 1982, Pat. No. 4,396,720.

[51] Int. Cl.$^3$ .................................................. C03C 3/22
[52] U.S. Cl. ............................................. 65/33; 501/5
[58] Field of Search ............................ 65/33; 501/5, 64

[56] References Cited

U.S. PATENT DOCUMENTS

| | | | |
|---|---|---|---|
| 3,146,114 | 8/1964 | Kivlighn | 65/33 X |
| 3,540,895 | 11/1970 | Scheidler et al. | 501/5 |
| 3,681,102 | 8/1972 | Beall | 501/10 |
| 3,881,945 | 5/1975 | Trojer et al. | 501/5 |
| 3,905,824 | 9/1975 | Grossman | 65/33 X |
| 4,285,728 | 8/1981 | Babcock et al. | 65/33 X |

FOREIGN PATENT DOCUMENTS 1022681 3/1966 United Kingdom ................ 65/33

Primary Examiner—Kenneth M. Schor
Attorney, Agent, or Firm—C. S. Janes, Jr.

[57] ABSTRACT

This invention is concerned with the production of substantially transparent glass-ceramic articles containing mullite as the predominant crystal phase which can be prepared by crystallizing in situ precursor glasses capable of being melted at temperatures no higher than 1650° C. The inventive articles consist essentially, in weight percent, of 10–70% $SiO_2$, 7–40% $B_2O_3$, 14–50% $Al_2O_3$, 0–35% RO, wherein RO consists of at least one member of the group in the indicated proportions of 0–15% MgO, 0–20% CaO, 0–30% SrO, 0–30% BaO, and 0–30% PbO, and 0–30% $R_2O$, wherein $R_2O$ consists of at least one member of the group in the indicated proportions of 0–10% $Li_2O$, 0–15% $Na_2O$, 0–25% $K_2O$, 0–25% $Rb_2O$, and 0–25% $Cs_2O$, the mole ratio $Al_2O_3$:-RO+$R_2O$>1.3. Where 0.01–1% $Cr_2O_3$ is included in the composition, the glass-ceramic will exhibit broad absorption over the visible region of the radiation spectrum, strong fluorescence in the red and near infrared portions of the spectrum where exposed to ultraviolet and/or visible radiation, and relatively little overlap of the absorption and fluorescent spectra.

8 Claims, 1 Drawing Figure

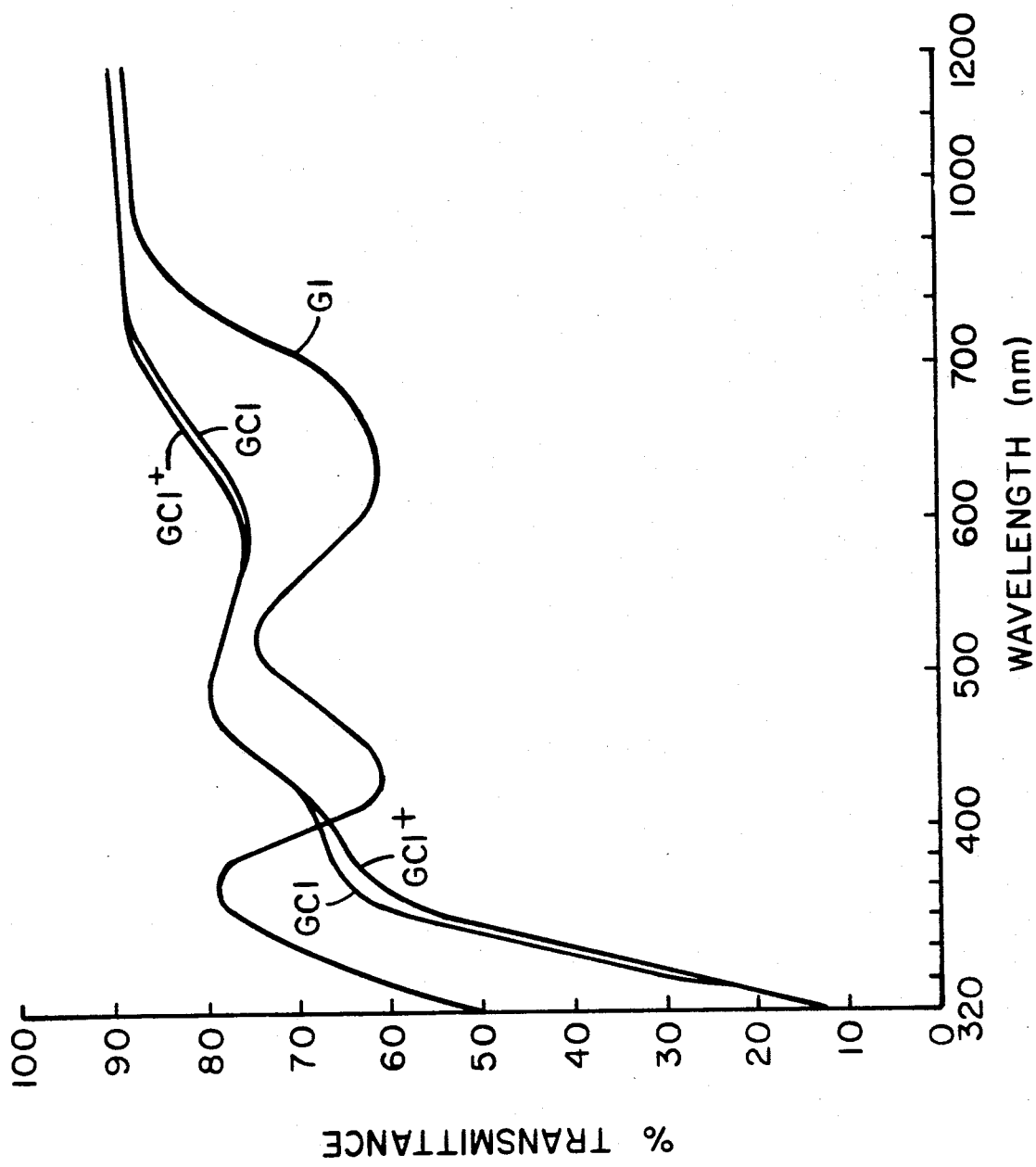

TRANSPARENT GLASS-CERAMICS CONTAINING MULLITE

This is a division of application Ser. No. 395,617, filed July 6, 1982, now U.S. Pat. No. 4,396,720.

BACKGROUND OF THE INVENTION

In accordance with U.S. Pat. No. 2,920,971, the basic disclosure in the field of glass-ceramic production, such bodies are prepared via three general steps: first, a glass-forming batch is melted; second, that melt is simultaneously cooled and a glass body of a desired configuration shaped therefrom; and, third, that glass body is heat treated at temperatures above the annealing point and, frequently, above the softening point of the glass for a sufficient length of time to cause the glass to crystallize in situ. The heat treatment can be scheduled in such a manner as to control the size and, in some instances, the identity of the crystals developed. Therefore, in sum, the crystallization present in a glass-ceramic article can be the result of both the base composition of the precursor glass body and the heat treatment applied thereto.

Transparent glass-ceramic articles are well-known to the art; the classic study thereof being authored by G. H. Beall and D. A. Duke in "Transparent Glass-Ceramics", *Journal of Materials Science*, 4, pages 340–352 (1969). As is explained by those writers, glass-ceramic bodies will display transparency to the eye when the crystals present therein are considerably smaller than the wavelength of visible light or the birefringence within the crystals and refractive index difference between the crystals and the residual glass are very small. The authors noted three general composition areas in the alumino-silicate glass-ceramic system wherein highly transparent articles can be produced. In the first composition field, $\beta$-quartz or $\beta$-eucryptite solid solution comprises the predominant crystal phase. In the second region, spinel solid solution constitutes the primary crystal phase. In the third area, mullite makes up the principal crystal phase.

The production of transparent glass-ceramic articles containing $\beta$-quartz or $\beta$-eucryptite solid solution as the predominant crystal phase has been the subject of numerous patents and scientific papers. U.S. Pat. Nos. 3,241,985 and 3,252,811 are illustrative of such disclosures and the Beall and Duke paper cited above provides a definitive discussion of the composition and process parameters required to prepare such products, along with a study of the crystallization mechanism involved.

Glass compositions capable of being converted into transparent glass-ceramic articles containing zinc spinel, i.e., gahnite ($ZnO.Al_2O_3$), as the predominant crystal phase are disclosed in U.S. Pat. No. 3,681,102. That patent also observed that the inclusion of a minor amount of $Cr_2O_3$ in the compositions induced the development of a dark red fluorescence when the glass-ceramic bodies were exposed to ultraviolet and/or visible light. Thus, transparent glass-ceramic articles capable of demonstrating dark red fluorescence could be prepared from glasses consisting essentially, in weight percent on the oxide basis, of about 2–20% ZnO, 0–5% MgO, 8–25% $Al_2O_3$, 0.01–1% $Cr_2O_3$, 55–75% $SiO_2$, and 2–12% $ZrO_2$. The presence of MgO results in a zinc spinel solid solution $(Zn, Mg) Al_2O_4$.

An extensive treatment of the production of glass-ceramic articles, including such articles exhibiting transparency, having base compositions in the $Al_2O_3$-$SiO_2$ system is provided by J. F. MacDowell and G. H. Beall in "Immiscibility and Crystallization in $Al_2O_3$-$SiO_2$ Glasses", *Journal of the Ceramic Society*, 52(1), pages 17–25 (1969). In that paper the authors elucidate the phase separation and crystallization mechanisms involved in the conversion into glass-ceramic bodies of both binary $Al_2O_3$-$SiO_2$ glasses and ternary glasses, i.e., $Al_2O_3$-$SiO_2$ glass compositions to which modest amounts of modifying oxides are added, specifically noting BaO, CaO, and $Na_2O$ as operable modifying oxides. The writers observed that the binary glasses readily phase separated such that fast quenching of the glass melts was demanded to obtain crystal-free precursor glass bodies. The addition of the modifying oxides tended to inhibit phase separation during cooling of the melt, thereby rendering it easier to secure homogeneous glass bodies. Nevertheless, the quantity of modifying oxide added must be carefully controlled. Hence, the molar ratio modifying oxide:$Al_2O_3$ must be maintained less than 1 or phase separation will not occur with the consequence that a fine-grained glass-ceramic body cannot be formed.

In contrast, the writers noted that small additions of such glass network formers as $B_2O_3$, BeO, $GeO_2$, $TiO_2$, and ZnO to the ternary system of compositions promoted ready separation of the glass into two phases as the melt cooled, thereby rendering the glass easily crystallizable in situ with the resultant glass-ceramic body having mullite or a mullite-cristobalite assemblage as the predominant crystal phase. The authors explained that the cations of the network formers are capable of occupying positions of fourfold oxygen coordination in place of $Si^{+4}$ or of sixfold coordination in a three-dimensional glass network. Because of that capability, the writers posited two possible explanations for the positive effects which the network former cations exerted upon phase separation and crystallization: (a) tetrahedral $Si^{+4}$ sites were occupied by the network former cations, thereby forcing some $Al^{+3}$ into octahedral coordination; or (b) the network former cations directly became a part of the immiscible, octahedrally-based aluminous (mullite-forming) network. Nucleating agents may be included in the compositions. For example, $Nb_2O_5$, $SnO_2$, $Ta_2O_5$, $TiO_2$, $WO_3$, and $ZrO_2$ are commonly in sixfold coordination with oxygen. Those ingredients can contribute along with $Al_2O_3$ to the formation of an immiscible octahedral glassy component upon cooling the glass melt, which ultimately results in internal nucleation. $Cr_2O_3$, however, is nowhere mentioned in the paper.

Unfortunately, the conventional binary and ternary aluminosilicate glass compositions operable as precursors for the preparation of glass-ceramic bodies containing mullite as the predominant crystal phase are characterized by high melting and working temperatures, customarily at least 1800° C. MacDowell and Beall in the above paper employed melting temperatures of 1850°–1900° C. Not only do such elevated temperatures impose very high energy costs, but also attack upon the refractory materials of the melting unit becomes very serious.

Therefore, the primary objective of the instant invention is to provide glass-ceramic articles containing mullite as the predominant and, preferably, sole crystal phase which are substantially and, desirably, totally transparent, which can be prepared from parent glass compositions capable of being melted at temperatures no higher than 1650° C., and which can be crystallized in situ at high glass viscosities, viz., about $10^9$–$10^{12}$ poises.

The use of dopants in glasses and glass-ceramics to impart color, luminescence, fluorescence, or other physical phenomena thereto is well-recognized in the art. Such dopants have included chromium, cobalt, copper, erbium, iron, manganese, nickel, praseodymium, terbium, tin, uranium, vanadium, and tungsten. Accordingly, an objective complementary to the above-described primary objective of the invention would be to provide such mullite-containing, glass-ceramic articles which are doped with ingredients to confer color and/or luminescence and/or fluorescence thereto.

It has been observed that the $Cr^{+3}$ ion, when placed in an appropriate octahedral ligand field, will exhibit fluorescence in the infrared region of the radiation spectrum. Hence, that phenomenon is the foundation of the alexandrite ($BeAl_2O_4$) single crystal laser recently described in the literature ("Alexandrite Lasers: Physics and Performance", J. C. Walling, *Laser Force*, February, 1982). The paper also described the role of $Cr^{+3}$ excited state transitions in fabricating a tunable laser device based upon $Cr^{+3}$-doped alexandrite crystals. That disclosure has prompted the suggestion that a tunable infrared laser could be designed utilizing $Cr^{+3}$-doped glasses or glass-ceramics. High optical quality, i.e., a very low level of haze, would be of paramount importance.

Another proposed application for $Cr^{+3}$-doped glasses or glass-ceramics would involve their use in the fabrication of luminescent solar collectors for use in conjunction with silicon photovoltaic cells. The concept contemplates employing such collectors to convert broad spectrum sunlight to the near infrared portion of the spectrum and then guide that radiation to silicon photovoltaic cells positioned around the periphery of the collector. Such a design would significantly reduce the quantity of silicon needed to produce a given amount of electricity, since silicon photovoltaic cells operate most efficiently in the near infrared regime of the spectrum. For that application, easy formability, chemical durability, broad temperature range, and relatively low cost, as well as excellent optical quality, would be premium qualities in addition to good fluorescence.

To investigate the possible utility of $Cr^{+3}$-doped, transparent glass-ceramic bodies in such applications as tunable lasers and solar collectors for use with silicon photovoltaic cells, compositions within each of the above-discussed three systems were doped with various levels of $Cr_2O_3$. Subsequent testing of samples indicated that the mullite-containing glass-ceramics were significantly more effective in converting ultraviolet and visible radiation to the infrared wavelengths where silicon photovoltaic cells operate most efficiently. Upon crystallization to mullite-containing glass-ceramics, the precursor glass body changes in color from a deep green to a transparent gray-brown, this phenomenon suggesting that the $Cr^{+3}$ ions undergo a change in coordination during that operation.

The mullite-containing specimens demonstrated a further advantage over the spinel-containing bodies. Thus, in contrast to the spinel-containing samples, the mullite-containing specimens displayed broad absorption in the visible region of the radiation spectrum, as evidenced by the gray-brown color. Spectral measurements suggest that there is relatively little overlap between the absorption and fluorescence wavelengths, this feature being of special significance in a material being considered in an application such as a luminescent solar collector.

Therefore, a specific objective of the instant invention is to provide substantially and, preferably, totally transparent glass-ceramic articles containing mullite as the predominant and, most desirably, sole crystal phase from parent glass compositions which can be melted at temperatures no higher than 1650° C., which can be crystallized in situ at high glass viscosities, viz., about $10^9$–$10^{12}$ poises, and which, when doped with $Cr^{+3}$ ions, will yield glass-ceramic bodies exhibiting broad absorption over the visible region of the radiation spectrum, strong fluorescence in the red and near infrared regions of the radiation spectrum upon being exposed to ultraviolet and/or visible radiation, and relatively little overlap between the absorption and fluorescent wavelengths.

SUMMARY OF THE INVENTION

We have found that the primary objective can be accomplished with precursor glasses having the following compositions, expressed in terms of weight percent on the oxide basis, of 10–70%, $SiO_2$, 7–40% $B_2O_3$, 14–50% $Al_2O_3$, 0–35% RO, wherein RO consists of at least one member selected from the group of MgO, CaO, SrO, BaO, and PbO, and 0–30% $R_2O$, wherein $R_2O$ consists of at least one alkali metal oxide selected from the group of $Li_2O$, $Na_2O$, $K_2O$, $Rb_2O$, and $Cs_2O$. The mole ratio $Al_2O_3$:RO+$R_2O$ must be greater than 1.3 and is preferably above 1.75. The sum of RO+$R_2O$ may be zero but is desirably above 2% to insure the essential absence of haze in the glass-ceramic body. $Al_2O_3$ will generally be held below 35% except where substantial levels of RO (at least 5% by weight) are included in the composition. Arsenic oxide may be incorporated into the composition in customary amounts as a fining agent.

To obtain the greatest degree of transparency in the final product, coupled with good chemical durability and glass melting and forming characteristics, the most preferred compositions in the $R_2O$-$Al_2O_3$-$B_2O_3$-$SiO_2$ system will consist essentially, expressed in terms of weight percent on the oxide basis, of 40–60%, $SiO_2$, 12–30% $B_2O_3$, 17.5–27.5% $Al_2O_3$, and 3–13% $Na_2O$ and/or $K_2O$. The most preferred compositions in the RO-$Al_2O_3$-$B_2O_3$-$SiO_2$ system will consist essentially, expressed in terms of weight percent on the oxide basis, of 15–45% $SiO_2$, 20–30% $B_2O_3$, 20–40% $Al_2O_3$, and 5–30% RO, wherein RO consists of 0–15% MgO, 0–20% CaO, 0–30% SrO, and 0–30% BaO.

In general, when employed as colorants, the transition metal ions will be present in amounts totaling no more than about 1% by weight calculated as the oxide, whereas the rare earth metal ions such as erbium, praseodymium, and terbium may be utilized in amounts totaling up to about 5% by weight calculated as the oxide. Such quantities do not significantly affect the overall physical and chemical properties of the base precursor glass or the glass-ceramic article crystallized in situ therefrom. Accordingly, up to about 1% total of transition metal ion colorants and/or up to about 5% total of rare earth metal ion colorants may be included in the base inventive compositions.

To secure the desired fluorescence, $Cr^{+3}$ ions will be present in an amount, calculated as the oxide, of about 0.01-1% $Cr_2O_3$ with the preferred range being about 0.03-0.3% $Cr_2O_3$. The essential absence of iron from the compositions is much preferred because $Fe^{+2}$ ions strongly absorb in the infrared portion of the radiation spectrum where $Cr^{+3}$ ions fluoresce. Thus, the use of batch materials of high purity, i.e., substantially free from iron, is highly desirable. The inclusion of $As_2O_5$ in the batch may also be useful in retaining any iron present in the $Fe^{+3}$, rather than the $Fe^{+2}$, state.

In general, the glasses begin to crystallize at temperatures as low as 700° C. Higher temperatures expedite crystallization but execessively high temperatures lead to grain growth of the mullite crystals with the consequent development of haze in the glass-ceramic product. Therefore, 950° C. has been deemed to be a practical maximum crystallization temperature with levels lower than 900° C. being preferred. To insure the most uniformly fine-grained bodies, the parent glasses will frequently be subjected initially to a nucleating heat treatment at about 700°-750° C. followed by growth of crystals upon those nuclei at 750°-900° C. Specific dwell periods at any one temperature are not demanded, but the glass must be exposed to temperatures within the 700°-950° C. regime for a period of time sufficient to effect the desired crystallization in situ. Extended heat treatment exposures also lead to grain growth of the mullite crystals. Consequently, times as brief as 0.25 hour may be sufficient at the upper extreme of the treatment range. In general, times between about 1-8 hours have been found operable to yield glass-ceramics essentially free from haze. Where a two-step crystallization process is followed, nucleation of about 1-2 hours will precede about 1-4 hours crystallization heat treatment. The crystal phase will normally comprise between about 20-65% by volume of the body.

In summary, the glass-ceramic articles of the instant invention are produced in accordance with the following four general steps:

(1) a glass batch of the proper composition is melted;

(2) that melt is simultaneously cooled to a temperature at least below the transformation range thereof and a glass article of a desired configuration shaped therefrom;

(3) that glass article is exposed to a temperature between about 700°-950° C. for a sufficient length of time to develop crystallization in situ; and then (4) that crystallized article is cooled to room temperature.

The relatively substantial amounts of $B_2O_3$ included in the base ternary aluminosilicate glass compositions are deemed to act as a reflux therefor. $B_2O_3$ is uniquely suited to perform as a flux to reduce the refractoriness of these aluminosilicate glasses for four reasons: (1) there are no ternary $B_2O_3$-$Al_2O_3$-$SiO_2$ compounds in contrast with almost all other additions to the $Al_2O_3$-$SiO_2$ binary; (2) $B_2O_3$ can enter both the glass and mullite phases to improve the stability of the mullite-glass mixture; (3) boroaluminosilicate glasses with small amounts of modifying oxides have, in like manner to mullite, a relatively low coefficient of thermal expansion, thereby resulting in little expansion mismatch; and (4) $B_2O_3$-$Al_2O_3$-$SiO_2$ glasses are generally quite viscous, thereby helping to reduce mullite grain growth with consequent improved transparency.

The composition of the mullite crystallites, which have diameters of less than 100 Å in the bodies exhibiting the best transparency, is not known with irrefutable precision, but is believed to consist of a solid solution between $3Al_2O_3.2SiO_2$ and $9Al_2O_3.2B_2O_3$. Such solid solution is recognized and described in the phase equilibria literature, e.g., *Phase Diagrams for Ceramists*, Levin, Robbins, and McMurdie, The American Ceramic Society, 1964, page 121.

X-ray diffraction analysis of the unit cell parameters of the crystallites has provided additional evidence to support the hypothesis that boron is incorporated into the mullite structure. Thus, the 'c' cell edge in the mullite structure represents the distance between two oxygens attached to the same tetrahedral cation. This edge has been observed to shrink as the boron content is increased in the precursor glass batch. The shortening of this edge is consistent with the substitution of boron for aluminum in the mullite structure, since boron forms much shorter bonds to oxygen than does aluminum; that factor resulting in an overall decrease in the average oxygen-oxygen distance in the crystallite structure.

BRIEF DESCRIPTION OF THE DRAWINGS

The appended drawing presents transmission curves illustrating the differences in absorption characteristics existing between the inventive precursor glass and a glass-ceramic crystallized in situ therefrom.

DESCRIPTION OF PREFERRED EMBODIMENTS

Table I records a number of parent glass compositions, expressed in terms of parts by weight on the oxide basis, illustrating the parameters of the present invention. Because the sum of the individual components totals or closely approximates 100, for all practical purposes the reported values can be deemed to reflect weight percent. An approximate mole ratio $Al_2O_3$:$RO+R_2O$ is also reported for each composition. The actual batch ingredients may comprise any materials, either the oxide or other compound, which, when melted together, it will be converted into the desired oxide in the proper proportions.

The constituents for each of the tabulated exemplary compositions were compounded, ballmilled together to assist in achieving a homogeneous melt, and then placed into platinum crucibles. The crucibles were introduced into a furnace operating at 1650° C. and the batches melted for 4-16 hours. The melts were poured into steel molds to produce slabs having the dimensions of about $4''\times4''\times\frac{1}{2}''$ or $4''\times8''\times\frac{1}{2}''$, and those slabs were immediately transferred to an annealer operating at about 600° C.

TABLE I

| | 1 | 2 | 3 | 4 | 5 | 6 | 7 | 8 |
|---|---|---|---|---|---|---|---|---|
| $SiO_2$ | 45 | 40 | 45 | 45 | 60 | 45 | 50 | 40 |
| $B_2O_3$ | 15 | 15 | 20 | 15 | 15 | 30 | 15 | 25 |
| $Al_2O_3$ | 30 | 35 | 25 | 30 | 20 | 20 | 25 | 25 |
| $K_2O$ | 10 | 10 | 10 | — | 5 | 5 | 10 | 10 |
| $Na_2O$ | — | — | — | 10 | — | — | — | — |
| $Cr_2O_3$ | 0.05 | 0.05 | 0.05 | 0.05 | 0.05 | 0.05 | 0.05 | 0.05 |
| $As_2O_5$ | 0.05 | 0.05 | 0.05 | 0.05 | 0.05 | 0.05 | 0.05 | 0.05 |
| $Al_2O_3$:$RO+R_2O$ | 2.86 | 3.22 | 2.30 | 1.82 | 3.69 | 3.69 | 3.69 | 2.30 |

| | 9 | 10 | 11 | 12 | 13 | 14 | 15 | 16 |
|---|---|---|---|---|---|---|---|---|
| $SiO_2$ | 20 | 49 | 65 | 60 | 58 | 40 | 42.5 | 42.5 |
| $B_2O_3$ | 25 | 15 | 15 | 20 | 20 | 35 | 30 | 30 |
| $Al_2O_3$ | 35 | 30 | 15 | 15 | 20 | 20 | 20 | 20 |
| $K_2O$ | 20 | — | 5 | 5 | — | 5 | 7.5 | 7.5 |
| $CaO$ | — | 6 | — | — | — | — | — | — |
| $MgO$ | — | — | — | — | 2 | — | — | — |
| $Cr_2O_3$ | 0.05 | 0.05 | 0.05 | 0.05 | 0.05 | 0.05 | 0.10 | 0.30 |
| $As_2O_5$ | 0.05 | 0.05 | 0.05 | 0.05 | 0.05 | 0.05 | 0.05 | 0.05 |

TABLE I-continued

| | | | | | | | | |
|---|---|---|---|---|---|---|---|---|
| Al$_2$O$_3$:RO + R$_2$O | 1.62 | 2.74 | 2.76 | 2.76 | 3.95 | 3.69 | 2.46 | 2.46 |

| | 17 | 18 | 19 | 20 | 21 | 22 | 23 | 24 |
|---|---|---|---|---|---|---|---|---|
| SiO$_2$ | 53.5 | 55 | 45 | 45 | 50 | 15 | 55 | 55 |
| B$_2$O$_3$ | 25 | 25 | 20 | 20 | 25 | 30 | 20 | 20 |
| Al$_2$O$_3$ | 20 | 20 | 25 | 25 | 20 | 25 | 20 | 20 |
| K$_2$O | — | — | — | — | — | — | 5 | 5 |
| Li$_2$O | 1.5 | — | — | — | — | — | — | — |
| BaO | — | — | 10 | — | — | — | — | — |
| SrO | — | — | — | 10 | 5 | — | — | — |
| PbO | — | — | — | — | — | 30 | — | — |
| Cr$_2$O$_3$ | 0.05 | 0.05 | 0.05 | 0.05 | 0.05 | 0.05 | 0.10 | 0.20 |
| As$_2$O$_5$ | 0.05 | 0.05 | 0.05 | 0.05 | 0.05 | 0.05 | 0.05 | 0.05 |
| Al$_2$O$_3$:RO + R$_2$O | 3.93 | ∞ | 3.76 | 2.53 | 4.06 | 1.83 | 3.69 | 3.69 |

| | 25 | 26 | 27 | 28 | 29 | 30 | 31 | 32 |
|---|---|---|---|---|---|---|---|---|
| SiO$_2$ | 45 | 45 | 35 | 60 | 55 | 45 | 55 | 50 |
| B$_2$O$_3$ | 20 | 20 | 20 | 17.5 | 15 | 25 | 15 | 20 |
| Al$_2$O$_3$ | 25 | 25 | 20 | 20 | 25 | 20 | 20 | 20 |
| K$_2$O | 10 | 10 | — | — | — | — | — | — |
| Na$_2$O | — | — | — | 2.5 | — | — | — | — |
| Cs$_2$O | — | — | 25 | — | — | — | — | — |
| MgO | — | — | — | — | 5 | — | — | — |
| BaO | — | — | — | — | — | 10 | 10 | — |
| SrO | — | — | — | — | — | — | — | 10 |
| Cr$_2$O$_3$ | 0.10 | 0.20 | 0.20 | 0.05 | 0.05 | 0.05 | 0.05 | 0.05 |
| As$_2$O$_5$ | 0.05 | 0.05 | 0.05 | 0.05 | 0.05 | 0.05 | 0.05 | 0.05 |
| Al$_2$O$_3$:RO + R$_2$O | 2.30 | 2.30 | 2.21 | 3.04 | 1.98 | 3.01 | 3.01 | 2.03 |

| | 33 | 34 | 35 | 36 | 37 | 38 | 39 | 40 |
|---|---|---|---|---|---|---|---|---|
| SiO$_2$ | 57.5 | 40 | 60 | 60 | 59 | 59 | 65 | 65 |
| B$_2$O$_3$ | 20 | 22.5 | 20 | 25 | 6 | 20 | 17.5 | 10 |
| Al$_2$O$_3$ | 20 | 22.5 | 20 | 15 | 25 | 20 | 15 | 20 |
| K$_2$O | 2.5 | — | — | — | 10 | — | — | — |
| PbO | — | 15 | — | — | — | — | — | — |
| Na$_2$O | — | — | — | — | — | 1 | 2.5 | 5 |
| Cr$_2$O$_3$ | 0.05 | 0.05 | 0.05 | 0.05 | 0.05 | 0.05 | 0.05 | 0.05 |
| As$_2$O$_5$ | 0.05 | 0.5 | 0.5 | 0.5 | 0.5 | 0.5 | 0.5 | 0.5 |
| Al$_2$O$_3$:RO + R$_2$O | 7.37 | 3.82 | ∞ | ∞ | 2.30 | 12.2 | 3.63 | 2.43 |

| | 41 | 42 | 43 | 44 | 45 | 46 | 47 | 48 |
|---|---|---|---|---|---|---|---|---|
| SiO$_2$ | 21.9 | 20.1 | 24.8 | 21.9 | 50 | 26.4 | 22.3 | 19.4 |
| B$_2$O$_3$ | 19.0 | 17.5 | 21.5 | 18.5 | — | 15.3 | 22.6 | 22.5 |
| Al$_2$O$_3$ | 46.3 | 42.6 | 42.0 | 45.2 | 40 | 44.9 | 33.1 | 33.0 |
| CaO | 12.7 | 7.0 | 11.6 | 11.7 | — | — | — | — |
| BaO | — | 12.8 | — | — | 10 | — | 24.9 | 24.8 |
| MgO | — | — | — | — | — | 13.3 | — | — |
| Cr$_2$O$_3$ | 0.06 | 0.05 | 0.06 | — | 0.05 | 0.5 | 0.1 | 0.05 |
| Al$_2$O$_3$:RO + R$_2$O | 2.0 | 2.0 | 2.0 | 2.0 | 6.0 | 2.0 | 2.0 | 2.0 |

| | 49 | 50 | 51 | 52 | 53 | 54 |
|---|---|---|---|---|---|---|
| SiO$_2$ | 21.2 | 20.3 | 10.7 | 23.5 | 21.1 | 39.6 |
| B$_2$O$_3$ | 24.6 | 23.5 | 24.9 | 27.2 | 24.5 | 27.6 |
| Al$_2$O$_3$ | 36.0 | 34.5 | 36.5 | 39.9 | 35.9 | 26.9 |
| SrO | 18.3 | 8.8 | 27.8 | — | — | — |
| CaO | — | — | — | 5.5 | 4.9 | 5.9 |
| BaO | — | 12.9 | — | — | 13.5 | — |
| MgO | — | — | — | 3.9 | — | — |
| Cr$_2$O$_3$ | 0.05 | 0.05 | 0.05 | 0.05 | 0.05 | 0.05 |
| Al$_2$O$_3$:RO + R$_2$O | 2.0 | 2.0 | 1.33 | 2.0 | 2.0 | 2.5 |

Table II recites the visual appearance of the glass slab, the heat treatment schedule to which each slab was exposed to generate crystallization in situ, the visible appearance of the glass-ceramic slab, and the visible fluorescence exhibited by specimens cut from the slabs to dimensions of about 1.5"×1.5"×0.25", when irradiated with an ultraviolet lamp having a principal zone of radiation at about 3660 Å. The specimens evidenced virtually no fluorescence when subjected to radiation from an ultraviolet lamp having a principal zone of radiation at about 2537 Å. In each heat treatment schedule recorded, the glass slab was introduced into an electrically-fired furnace and the temperature raised therein at about 5° C./minute, except where noted otherwise, to the stated dwell periods. After completing the top temperature hold, the electricity to the furnace was merely cut off and the bodies allowed to cool to room temperature within the furnace. This practice has been termed "cooling at furnace rate" by the glass-ceramic art.

TABLE II

| Example | Glass Appearance | Heat Treatment | Glass-Ceramic Appearance | Visible Fluorescence |
|---|---|---|---|---|
| 1 | Clear, green | 750° C. for 2 hours<br>800° C. for 4 hours | Gray-green, slight haze | Strong red |
| 2 | Clear, green | 750° C. for 4 hours | Gray, clear, slight haze | Strong red |
| 3 | Clear, green | 700° C. for 2 hours<br>750° C. for 2 hours | Gray-turquoise, clear | Strong red |
| 4 | Clear, green | 700° C. for 2 hours<br>750° C. for 2 hours | Gray, hazy | Medium red |
| 5 | Clear, green | 750° C. for 2 hours<br>850° C. for 2 hours | Gray-green, clear | Medium red |
| 6 | Clear | 700° C. for 2 hours<br>750° C. for 2 hours | Gray, slight haze | Medium orange |
| 7 | Clear | 750° C. for 2 hours<br>850° C. for 2 hours | Gray-turquoise, clear | Medium red |
| 8 | Clear | 700° C. for 2 hours<br>750° C. for 2 hours | Gray, clear | Medium scarlet |
| 9 | Clear, green, slight devitrification | 700° C. for 2 hours<br>750° C. for 2 hours | Gray, slight haze | Weak orange |
| 10 | Clear, green, slight stone | 750° C. for 2 hours<br>900° C. for 2 hours | Hazy, translucent | Medium red |
| 11 | Clear, green, some seed | 700° C. for 2 hours<br>750° C. for 4 hours | Gray-green, clear | Weak red |
| 12 | Clear | 700° C. for 2 hours<br>750° C. for 4 hours | Gray-green, clear | Weak red |
| 13 | Green, slight haze | 750° C. for 2 hours<br>800° C. for 4 hours | Gray, clear, some haze | Medium red |
| 14 | Green, some haze in interior | 750° C. for 2 hours<br>800° C. for 4 hours | Gray, some haze | Medium red |
| 15 | Clear, blue-green | 700° C. for 2 hours<br>750° C. for 2 hours | Gray, clear | Medium red |
| 16 | Very dark blue-green | 700° C. for 2 hours<br>800° C. for 2 hours | Dark gray | Weak crimson |
| 17 | Blue-green, clear, some hazy areas | 700° C. for 2 hours | Gray, clear | Medium red |

TABLE II-continued

| Example | Glass Appearance | Heat Treatment | Glass-Ceramic Appearance | Visible Fluorescence |
|---|---|---|---|---|
| 18 | Hazy | 700° C. for 2 hours<br>750° C. for 4 hours | Gray, slight haze | Medium red |
| 19 | Clear, green | 750° C. for 2 hours<br>800° C. for 4 hours | Gray, clear | Medium orange |
| 20 | Clear, green | 750° C. for 2 hours<br>800° C. for 4 hours | Gray, clear | Medium orange |
| 21 | Clear, green | 750° C. for 2 hours<br>800° C. for 4 hours | Gray, clear | Medium red |
| 22 | Clear on edges, center hazy | 750° C. for 2 hours<br>800° C. for 4 hours | Gray, clear, some haze | Medium salmon |
| 23 | Clear, green | 750° C. for 2 hours<br>800° C. for 4 hours | Gray-turquoise, clear | Crimson |
| 24 | Dark green, clear | 750° C. for 2 hours<br>800° C. for 4 hours | Dark gray-turquoise, clear | Crimson |
| 25 | Green, clear | 750° C. for 2 hours<br>800° C. for 4 hours | Dark gray-turquoise, clear | Crimson |
| 26 | Dark green, clear | 750° C. for 2 hours<br>800° C. for 4 hours | Dark gray-turquoise, clear | Crimson |
| 27 | Green, clear | 700° C. for 2 hours<br>750° C. for 4 hours | Gray, clear | Medium red |
| 28 | Blue-green, clear | 750° C. for 2 hours<br>800° C. for 4 hours | Gray-green, clear | Strong crimson |
| 29 | Green, clear | 750° C. for 2 hours<br>800° C. for 4 hours | Gray, hazy | Strong salmon |
| 30 | Blue-green, seedy | 700° C. for 2 hours<br>750° C. for 2 hours | Gray-green, clear | Strong yellow |
| 31 | Green, clear | 750° C. for 2 hours<br>800° C. for 4 hours | Gray-turquoise, clear | Strong orange |
| 32 | Green, clear | 750° C. for 2 hours<br>800° C. for 4 hours | Hazy | Strong pink |
| 33 | Green, clear | 750° C. for 2 hours<br>800° C. for 4 hours | Gray-green, clear | Weak red-orange |
| 34 | Clear on edges, center hazy | 700° C. for 2 hours<br>800° C. for 4 hours | Clear, slight haze | Medium salmon |
| 35 | Gray-green, some haze | 750° C. for 2 hours | Gray, some haze | Medium red |
| 36 | Green, clear on edges, center hazy | 750° C. for 2 hours<br>800° C. for 4 hours | Gray-green, clear with some haze in interior | Medium red |
| 37 | Green, some seeds | 900° C. for 4 hours | Gray-green, hazy | Weak red |
| 38 | Green, clear edges, hazy interior | 700° C. for 2 hours<br>800° C. for 4 hours | Gray, clear edges, hazy interior | Medium red |
| 39 | Blue-green, clear | 750° C. for 2 hours<br>800° C. for 4 hours | Gray-green edges | Medium-strong crimson |
| 40 | Green, clear | 750° C. for 2 hours | Gray-green, some haze | Weak red |
| 41 | Green, clear, some devitrification | 760° C. for 3.2 hours<br>810° C. for 2 hours | Gray, hazy | Medium magenta |
| 42 | Green, clear, some devitrification | 760° C. for 3.2 hours<br>810° C. for 2 hours | Gray-green, hazy | Strong magenta |
| 43 | Green, clear, some devitrification | 760° C. for 3.2 hours<br>810° C. for 2 hours | Gray, hazy | Medium magenta |
| 44 | Green, clear, some devitrification | 760° C. for 3.2 hours<br>810° C. for 2 hours | Hazy | No fluorescence |
| 45 | Did not melt | | | |
| 46 | Very dark green, clear | 300° C./hour to 800° C.<br>50° C./hour to 850° C.<br>300° C./hour to 1000° C. | Gray, translucent | Red |
| 47 | Green, clear | 300° C./hour to 750° C.<br>50° C./hour to 850° C.<br>850° C. for 1 hour | Gray, translucent | Dull red |
| 48 | Green, clear, slight devitrification | 850° C. for 1 hour | Gray, hazy | Red |
| 49 | Green, clear, slight unmelted batch | 850° C. for 1 hour | Gray, slight haze | Brown-red |
| 50 | Green, clear, slight devitrification | 850° C. for 1 hour | Gray, hazy | Red |
| 51 | Green, clear, very slight devitrification | 850° C. for 1 hour | Gray-white, cloudy | Dark red |
| 52 | Green, clear, slight devitrification | 850° C. for 1 hour | Gray-white, cloudy | Dull red |
| 53 | Green, clear, very slight devitrification | 850° C. for 1 hour | Gray, very slight haze | Dull red-brown |
| 54 | Green, clear | 750° C. for 3 hours<br>800° C. for 1 hour | Gray, slight haze | Strong red |

A study of Tables I and II points out the criticality of compositions and heat treatment to obtain the desired product. Thus, Example 44, containing no $Cr_2O_3$, evidences no fluorescence when subjected to ultraviolet radiation. Example 45, a "conventional" ternary aluminosilicate composition, could not be melted at 1650° C. Example 37 illustrates that at least about 7% $B_2O_3$ is required to insure a homogeneous parent glass.

The appended drawing comprises spectral transmission curves exhibited by polished plates of Example 1 utilizing a Varian Cary 17DX spectrophotometer, each plate having a thickness of 4 mm. The curve labelled G1 designates a plate of Example 1 in the state of annealed glass. The curve labelled GC1 signifies a plate of Example 1 in the glass-ceramic state, the precursor glass having been crystallized in situ via heat treatment at 750° C. for four hours (the heat treatment applied to Example 1 in Table II). The curve labelled GC 1+ indicates a plate of Example 1 in the glass-ceramic state, the precursor glass having been crystallized in situ via a two-step heat treatment; viz., 750° C. for two hours followed by 800° C. for four hours.

It is immediately apparent from the drawing that the transmission of the parent glass is substantially different from that of the glass-ceramic crystallized therefrom. For example, the glass-ceramic is actually more transmitting in the visible region of the radiation spectrum (400-700 nm) than the original glass. The glass-ceramic is more uniformly absorbing across the visible region (manifested by the gray element in the color) than the glass (evidenced by the solid green color). Finally, the glass-ceramic is more absorbing in the ultraviolet regime of the radiation spectrum (<400 nm). The greater absorption in the 350-400 nm range of wavelengths is of special significance where a material is to be utilized in a solar collector, because this is the area of maximum ultraviolet output in the solar spectrum.

A comparison of curves GC 1 and GC 1+ demonstrates that variations in heat treatments do not substantively alter the transmittance characteristics of the inventive products.

We claim:

1. A method for making a substantially transparent glass-ceramic article containing mullite as the predominant crystal phase comprising the steps of:
    (a) melting a batch for a glass capable of being melted at temperatures no higher than 1650° C., capable of being crystallized in situ at high viscosities, i.e., about $10^9$–$10^{12}$ poises, and consisting essentially, expressed in terms of weight percent on the oxide basis, of 40-60% $SiO_2$, 12-30% $B_2O_3$, 17.5-27.5% $Al_2O_3$, and 3-13% $Na_2O$ and/or $K_2O$, the glass having a mole ratio $Al_2O_3:R_2O > 1.75$.
    (b) cooling said melt to a temperature at least below the transformation range of the glass and simultaneously shaping a glass article of a desired geometry therefrom;
    (c) exposing said glass article to a temperature between about 700°-950° C. for a period of time sufficient to cause the generation of crystallization in situ at a viscosity of about $10^9$–$10^{12}$ poises and to provide a crystallized glass article which is substantially transparent and contains mullite as the predominant crystalline phase; and then
    (d) cooling said crystallized article to room temperature.

2. A method according to claim 1 wherein said glass article is initially exposed to a temperature of about 700°-750° C. for about 1-2 hours followed by exposure to a temperature of about 750°-900° C. for about 1-4 hours.

3. A method according to claim 1 wherein said glass also contains up to 1% total of transition metal oxides and/or up to 5% total of rare earth metal oxides as colorants.

4. A method according to claim 1 wherein said glass also contains 0.01-1% $Cr_2O_3$ such that said glass-ceramic article demonstrates broad absorption over the visible range of the radiation spectrum, strong fluorescence in the red and near infrared portions of the spectrum when exposed to ultraviolet and/or visible radiation, and relatively little overlap of the absorption and fluorescent spectra.

5. A method for making a substantially transparent glass-ceramic article containing mullite as the predominant crystal phase comprising the steps of:
    (a) melting a batch for a glass capable of being melted at temperatures no higher than 1650° C., capable of being crystallized in situ at high viscosities, i.e., about $10^9$–$10^{12}$ poises, and consisting essentially, expressed in terms of weight percent on the oxide basis, of 15-45% $SiO_2$ 20-30% $B_2O_3$, 20-40% $Al_2O_3$, and 5-30% RO, wherein RO consists of at least one member of the group in the indicated proportions of 0-15% MgO, 0-20% CaO, 0-30% SrO, 0-30% BaO, the glass having a mole ratio $Al_2O_3:R_2O > 1.75$;
    (b) cooling said melt to a temperature at least below the transformation range of the glass and simultaneously shaping a glass article of a desired geometry therefrom;
    (c) exposing said glass article to a temperature between about 700°-950° C. for a period of time sufficient to cause the generation of crystallization in situ at a viscosity of about $10^9$–$10^{12}$ poises and to provide a crystallized glass article which is substantially transparent and contains mullite as the predominant crystalline phase; and
    (d) cooling said crystallized article to room temperature.

6. A method according to claim 5 wherein said glass article is initially exposed to a temperature of about 700°-750° C. for about 1-2 hours followed by exposure to a temperature of about 750°-900° C. for about 4 hours.

7. A method according to claim 5 wherein said glass also contains up to 1% total of transition metal oxides and/or up to 5% total of rare earth metal oxides as colorants.

8. A method according to claim 5 wherein said glass also contains 0.01-1% $Cr_2O_3$ such that said glass-ceramic article demonstrates broad absorption over the visible range of the radiation spectrum, strong fluorescence in the red and near infrared portions of the spectrum when exposed to ultraviolet and/or visible radiation, and relatively little overlap of the absorption and fluorescent spectra.

* * * * *